United States Patent
Öztireli et al.

(10) Patent No.: US 11,568,212 B2
(45) Date of Patent: Jan. 31, 2023

(54) TECHNIQUES FOR UNDERSTANDING HOW TRAINED NEURAL NETWORKS OPERATE

(71) Applicant: DISNEY ENTERPRISES, INC., Burbank, CA (US)

(72) Inventors: Ahmet Cengiz Öztireli, Zurich (CH); Markus Gross, Zurich (CH); Marco Ancona, Zurich (CH)

(73) Assignees: DISNEY ENTERPRISES, INC., Burbank, CA (US); ETH ZÜRICH, (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 705 days.

(21) Appl. No.: 16/533,301

(22) Filed: Aug. 6, 2019

(65) Prior Publication Data
US 2021/0042613 A1  Feb. 11, 2021

(51) Int. Cl.
*G06N 3/04* (2006.01)
*G06F 17/15* (2006.01)
*G06F 17/18* (2006.01)

(52) U.S. Cl.
CPC .......... *G06N 3/0472* (2013.01); *G06F 17/15* (2013.01); *G06F 17/18* (2013.01); *G06N 3/0454* (2013.01)

(58) Field of Classification Search
CPC .... G06N 3/0472; G06N 3/0454; G06F 17/15; G06F 17/18
See application file for complete search history.

(56) References Cited

U.S. PATENT DOCUMENTS

| | | | |
|---|---|---|---|
| 8,775,341 B1 * | 7/2014 | Commons | G06F 40/253 706/20 |
| 9,015,093 B1 * | 4/2015 | Commons | B60W 30/00 706/26 |
| 2004/0002931 A1 * | 1/2004 | Platt | G06K 9/6276 706/46 |
| 2017/0024642 A1 * | 1/2017 | Xiong | G06N 3/08 |

(Continued)

OTHER PUBLICATIONS

Abdelaziz et al., "Uncertainty propagation through deep neural networks", In Interspeech Jun. 10, 2015, 6 pages.

(Continued)

*Primary Examiner* — Raymond L Nimox
(74) *Attorney, Agent, or Firm* — Artegis Law Group, LLP

(57) ABSTRACT

In various embodiments, a relevance application quantifies how a trained neural network operates. In operation, the relevance application generates a set of input distributions based on a set of input points associated with the trained neural network. Each input distribution is characterized by a mean and a variance associated with a different neuron included in the trained neural network. The relevance application propagates the set of input distributions through a probabilistic neural network to generate at least a first output distribution. The probabilistic neural network is derived from at least a portion of the trained neural network. Based on the first output distribution, the relevance application computes a contribution of a first input point included in the set of input points to a difference between a first output point associated with a first output of the trained neural network and an estimated mean prediction associated with the first output.

20 Claims, 4 Drawing Sheets

(56) References Cited

U.S. PATENT DOCUMENTS

| | | | |
|---|---|---|---|
| 2017/0249547 A1* | 8/2017 | Shrikumar | G06N 3/084 |
| 2018/0018553 A1* | 1/2018 | Bach | G06F 40/279 |
| 2019/0354865 A1* | 11/2019 | Reisser | G06N 3/0481 |
| 2020/0074269 A1* | 3/2020 | Trygg | G06F 17/18 |
| 2020/0125877 A1* | 4/2020 | Phan | G06N 3/04 |
| 2020/0134376 A1* | 4/2020 | Sallee | G06V 10/82 |
| 2020/0193296 A1* | 6/2020 | Dixit | G06V 10/82 |
| 2020/0302171 A1* | 9/2020 | Kim | G06F 17/16 |
| 2020/0349441 A1* | 11/2020 | Zhang | G06N 3/0472 |
| 2021/0097401 A1* | 4/2021 | Ramalho | G06N 3/084 |

OTHER PUBLICATIONS

Adebayo et al., "Sanity Checks for Saliency Maps", In Advances in Neural Information Processing Systems, 2018, pp. 9524-9535.

Ancona et al., "Towards better understanding of gradient-based attribution methods for deep neural networks", In 6th International Conference on Learning Representations (ICLR 2018), 2018, 16 pages.

Aumann et al., "Values of non-atomic games", Princeton University Press, 1974, 8 pages.

Bach et al., "On Pixel-Wise Explanations for Non-Linear Classifier Decisions by Layer-Wise Relevance Propagation", PloS one, vol. 10, No. 7, :e0130140, Jul. 10, 2015, 46 pages.

Boyen et al., "Tractable Inference for Complex Stochastic Processes", In Proceedings of the Fourteenth Conference an Uncertainty in Artificial Intelligence, UAI'98, San Francisco, CA, USA, 1998. Morgan Kaufmann Publishers Inc. ISBN 1-55860-555-X, pp. 33-42.

Castro et al., "Polynomial calculation of the shapley value based on sampling", Computers and Operations Research, 36, (5), ISSN 0305-0548. doi: https://doi.org/10.1016/j cor.2008.04.004. Selected papers presented at the Tenth International Symposium on Locational Decisions (ISOLDE X), 2009, pp. 1726-1730.

Chollet, F. et al. Keras. https://keras.io, 2015, 5 pages.

Datta et al., Algorithmic Transparency via Quantitative Input Influence: Theory and experiments with learning systems. In IEEE Symposium on Security and Privacy (SP), IEEE, 2016, pp. 598-617.

Doshi-Velez et al., "Towards A Rigorous Science of Interpretable Machine Learning", arXiv, Mar. 2, 2017, 13 pages.

Fatima et al., "A Linear Approximation Method for the Shapley Value", Artificial Intelligence, vol. 172 No. 14, 2008. ISSN 0004-3702. doi: https://doi.org/10.1016/j.artint.2008.05.003, pp. 1673-1699.

Fong et al., "Interpretable explanations of black boxes by meaningful perturbation", In IEEE International Conference on Computer Vision (ICCV), 2017, IEEE 2017, pp. 3449-3457.

Frey et al., "Variational learning in nonlinear gaussian belief networks", Neural Computation, vol. 11, No. 1, ISSN 0899-7667. doi: 10.1162/089976699300016872, Jan. 1999, pp. 193-213.

Gast et al., "Lightweight Probabilistic Deep Networks", In Proceedings of the IEEE Conference on Computer Vision and Pattern Recognition, 2018, pp. 3369-3378.

Ghorbani et al., "Interpretation of Neural Networks Is Fragile", The Thirty-Third AAAI Conference on Artificial Intelligence—2019, 8 pages.

Goodman et al., "European union regulations on algorithmic decision-making and a right to explanation", ICML Workshop on Human Interpretability in Machine Learning (WHI 2016), Jul. 12, 2016, 6 pages.

Jacobs et al., "Gate Sizing Using a Statistical Delay Model", In Proceedings Design, Automation and Test in Europe Conference and Exhibition 2000 (Cat. No. PR00537), doi: 10.1109/DATE.2000. 840285, Mar. 2000, pp. 283-290.

Kindermans et al., "The (un) reliability of saliency methods", NIPS 2017—Workshop on Interpreting, Explaining and Visualizing Deep Learning, 2017, 9 pages.

Kindermans et al., "Learning Howto Explain Neural Networks: Patternnet and Patternattribution", In International Conference on Learning Representations, 2018, 16 pages.

Lecun et al., "Gradient-Based Learning Applied to Document Recognition", Proceedings of the IEEE, vol. 86 No. 11, 1998, pp. 2278-2324.

Lipton, Z. C., The mythos of model Interpretability, ICML Workshop on Human Interpretability of Machine Learning, 2016, Mar. 6, 2017, 9 pages.

Lundberg et al., "A Unified Approach to Interpreting Model Predictions", In Guyon, I., Luxburg, U. V., Bengio, S., Wallach, H., Fergus, R., Vishwanathan, S., and Garnett, R. (eds.), Curran Associates, Inc., Advances in Neural Information Processing Systems 30, 2017, pp. 4765-4774.

Lundberg et al., "Explainable machine learning predictions for the prevention of hypoxaemia during surgery", Nature Biomedical Engineering, 2018, vol. 2 No. 10, pp. 749-763.

Matsui et al., "NP-completeness for calculating power indices of weighted majority games", Theoretical Computer Science, 263, 2001, (1-2), pp. 305-310.

Minka, Thomas P, "A Family of Algorithms for Approximate Bayesian Inference", PhD thesis, Cambridge, MA, USA, Jan. 12, 2001, AAI0803033, 75 pages.

Montavon et al., "Explaining nonlinear classification decisions with deep Taylor decomposition", Pattern Recognition, 2017, vol. 65, pp. 211-222.

Nie et al., "A Theoretical Explanation for Perplexing Behaviors of Backpropagation-based Visualizations", ICML 2018, 2018, 10 pages.

Osborne et al., "A Course in Game Theory", MIT press, 1994, 368 pages.

Ras et al., "Explanation Methods in Deep Learning: Users, Values, Concerns and Challenges", In Explainable and Interpretable Models in Computer Vision and Machine Learning, Springer, 2018, pp. 19-36.

Ribeiro et al., "why should I trust you?": Explaining the predictions of any classifier. In Proceedings of the 22Nd ACM SIGKDD International Conference on Knowledge Discovery and Data Mining, KDD '16, New York, NY, USA, 2016. ACM. ISBN 978-1-4503-4232-2. http://dx.doi.org/10.1145/2939672.2939778, pp. 1135-1144.

Selvaraju et al., G"rad-cam: Why did you say that? Visual Explanations from Deep Networks via Gradient-based Localization", http://gradcam.cloudcv.org, CoRR, abs/1610.02391, 2016, 9 pages.

Shapley, L. S. "A value for n-person games", Contributions to the Theory of Games, 1953, vol. 2, No. 28, pp. 307-317.

Shrikumar et al., "Not Just A Black Box: Learning Important Features Through Propagating Activation Differences", arXiv preprint arXiv:1605.01713, 2016, 6 pages.

Shrikumar et al., "Learning Important Features Through Propagating Activation Differences", In Precup, D. and Teh, Y.W. (eds.), Proceedings of the 34th International Conference on Machine Learning, vol. 70 of Proceedings of Machine Learning Research, International Convention Centre, Sydney, Australia, Aug. 2017, PMLR, pp. 3145-3153.

Simonyan et al., "Deep Inside Convolutional Networks: Visualising Image Classification Models and Saliency Maps", ICLR Workshop, Apr. 19, 2014, 8 pages.

Socci et al., "The Rectified Gaussian Distribution", In Advances in neural information processing systems, 1998, pp. 350-356.

Springenberg et al., "Striving for simplicity: The all Convolutional Net", ICLR 2015 Workshop, 2014, 14 pages.

Stumblj et al., "An Efficient Explanation of Individual Classifications using Game Theory", The Journal of Machine Learning Research, vol. 11, 2010, pp. 1-18.

Sun et al., Axiomatic Attribution for Multilinear Functions', In Proceedings of the 12th ACM Conference on Electronic Commerce, EC '11, pp. 177-178, New York, NY, USA, 2011. ACM. ISBN 978-1-1503-0261-6. doi: 10.1145/1993574.1993601, Jun. 5-9, 2011, 1 page.

Sundararajan et al., "Axiomatic Attribution for Deep Networks", In Precup, D. and Teh, Y. W. (eds.), Proceedings of the 34th International Conference on Machine Learning, vol. 70 of Proceedings of

(56) References Cited

OTHER PUBLICATIONS

Machine Learning Research, International Convention Centre, Sydney, Australia, Aug. 6-11, 2017. PMLR, pp. 3319-3328.

Thiagrajan et al., "Understand deep neural networks through input uncertainties", arXiv preprint arXiv:1810.13425, Nov. 1, 2018, 5 pages.

Tsanas et al., "Accurate Telemonitoring of Parkinson's Disease Progression by Noninvasive Speech Tests", IEEE Transactions on Biomedical Engineering, vol. 57, No. 4, Apr. 2010. ISSN 0018-9294. doi: 10.1109/TBME.2009.2036000, pp. 884-893.

Von Bahr, B. "On Sampling from a Finite Set of Independent Random Variables", Zeitschrift für Wahrscheinlichkeitstheorie und verwandte Gebiete, 1972, vol. 24, No. 4 pp. 279-286.

Zeiler et al., "Visualizing and understanding convolutional networks", In European conference on computer vision, Springer, 2014, pp. 818-833.

Zintgraf et al., "Visualizing deep neural network decisions: Prediction difference analysis", 2017, 12 pages.

\* cited by examiner

TECHNIQUES FOR UNDERSTANDING HOW TRAINED NEURAL NETWORKS OPERATE

BACKGROUND

Field of the Various Embodiments

Embodiments relate generally to artificial intelligence and neural networks and, more specifically, to techniques for understanding how trained neural networks operate.

Description of the Related Art

A neural network is a collection of interconnected parameterizable units known as "neurons" that can be trained to recognize and interpret patterns in data based on multiple examples of those patterns. Trained neural networks are used to solve problems for a wide variety of tasks, such as image recognition, search engine filtering, playing board games, character animation, medical diagnosis, piloting drones, driving automobiles, etc. However, because a typical neural network includes a large number of parameters (hundreds, thousands, or even tens of thousands or more) that are automatically adjusted during training, trained neural networks are usually implemented without any proper understanding of what the trained neural network actually learned during training. Understanding what a trained neural network learned during training is important in many different contexts, such as when mistakes in the output of the trained neural network can have serious consequences (e.g., in automated vehicle implementations), when attempting to improve the accuracy of the trained neural network (e.g., when debugging errors), when attempting to implement portions of the trained neural network to solve a new or different problem, and when pruning neurons to increase the efficiency of the trained neural network, to name a few.

As an example of the importance of understanding what a trained neural network learned during training, consider the scenario where a neural network is trained to classify images as either male or female based on training data that includes images of female faces shown against a brown background and images of male faces shown against a green background. Based on the output of the trained neural network generated in response to new images similar to the training data, a developer could erroneously believe that the trained neural network learned to classify images based on facial features; however, the trained neural network actually could have learned to classify images based on the color of the background instead. If the developer could understand that the trained neural network actually learned to classify images based on the color of the background during training, then the developer could re-train the neural network based on images of faces shown against a wide variety of background colors to increase the reliability of the trained neural network with respect to classifying images based on facial features.

In one approach to understanding how a trained neural network operates, heuristics are used to assign an attribution value to each input of the trained neural network. Each attribution value attempts to quantify the contribution of the input to which the attribution value is assigned to a particular output of the trained neural network. For example, if the inputs to a trained neural network were the pixels in an image and an output of the trained neural network was a probability that the image was an image of a dog, then the attribution value assigned to each pixel would indicate the relative importance of the pixel when computing the probability that the image was an image of a dog. One drawback of heuristic-based attribution methods is that the implemented heuristics oftentimes are not technically well-founded and/or are tailored to only a specific type of task and data. Accordingly, empirical data has shown that heuristic-based attribution methods can produce inaccurate and/or misleading results.

In another approach to understanding how a trained neural network operates, expected average marginal contributions (referred to as "Shapley values") are computed for different input values relative to one or more outputs. For example, to understand why a trained neural network misclassified a particular image as female, Shapley values could be computed for each pixel in the image relative to the output corresponding to the classification of female. The accuracy and reliability with which Shapley values quantify the contribution of each player to the outcomes of cooperative games is well-known and extending Shapley values to quantify contributions of input values to the outputs of trained neural networks is technically well-founded. Furthermore, empirical data has shown that Shapley values provide an accurate and unbiased representation of the behavior of trained neural networks. One drawback to using Shapley values to understand trained neural networks, though, is that the computational resources and time required to compute Shapley values can be prohibitive. In that regard, the number of times a trained neural network needs to be evaluated to compute the Shapley values for a set of input values is exponentially related to the number of inputs. Consequently, computing Shapley values for relatively complex neural networks (i.e., having more than a few dozen inputs) is simply not feasible.

As the foregoing illustrates, what is needed in the art are more effective techniques for understanding how trained neural networks operate.

SUMMARY

One embodiment sets forth a computer-implemented method for quantifying how a trained neural network operates. The method includes generating a plurality of input distributions based on a first plurality of input points associated with the trained neural network, where each input distribution is characterized by a mean and a variance associated with a different neuron included in the trained neural network; propagating the plurality of input distributions through a probabilistic neural network that is derived from at least a portion of the trained neural network to generate one or more output distributions; and based on a first output distribution included in the one or more output distributions, computing a contribution of a first input point included in the first plurality of input points to a difference between a first output point associated with a first output of the trained neural network and an estimated mean prediction associated with the first output.

At least one technical advantage of the disclosed techniques relative to the prior art is that the disclosed techniques can more efficiently and more reliably quantify how a trained neural network operates across a wide range of architectures and input types. In particular, contrary to prior art approaches that use unreliable and/or non-robust heuristics, the disclosed techniques use statistical approximation to compute estimated Shapley values that more accurately quantify the contributions of input points to output points. Further, estimating Shapley values using the disclosed techniques is computationally more efficient than computing exact Shapley values, as is done in prior art approaches. In this regard, the number of network evaluations required to estimate the Shapley values using the disclosed techniques is linearly related to the number of inputs, as opposed to exponentially related, which is the case in prior art approaches. Accordingly, the disclosed techniques consume less time and computational resources than prior art approaches and can be used to more accurately and effectively evaluate and understand how a trained neural network operates relative to prior art approaches. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
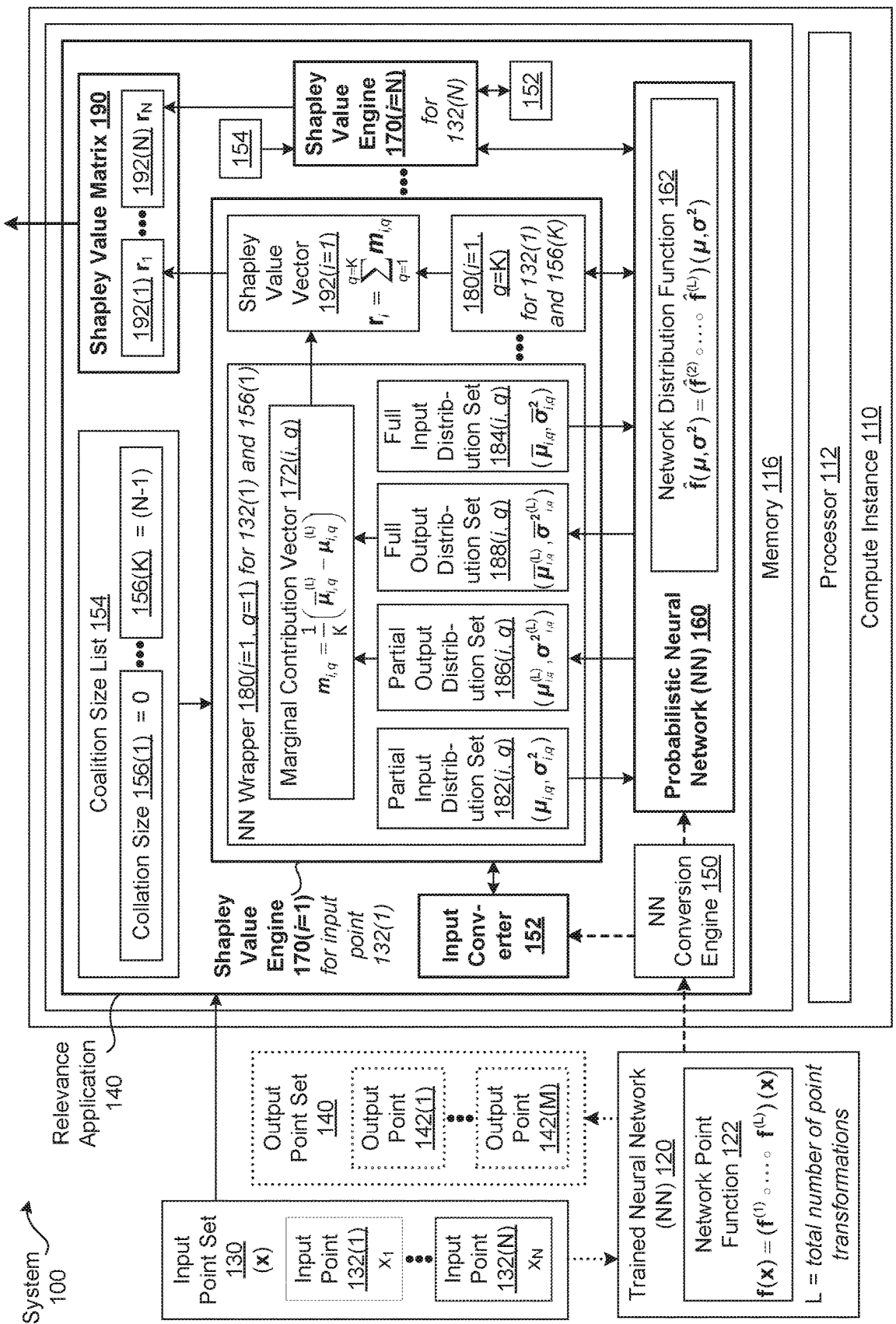
FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, a compute instance 110 and a trained neural network 120. For explanatory purposes, multiple instances of like objects are denoted with reference numbers identifying the object and parenthetical numbers identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110 and any number of trained neural networks 120 in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory; such as random access memory ("RAM"), read only memory ("ROM"), floppy disk, hard disk, or any other form of digital storage; local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to provide insight into what the trained neural network 120 learned during training. The trained neural network 120 may be a trained version of any type of neural network or a combination of any number and types of different trained neural networks. For instance, in various embodiments, the trained neural network 120 may be a trained convolutional neural network, a trained recurrent neural network, a trained multilayer perceptron, or any other type of trained neural network.

As depicted via dotted lines, the trained neural network 120 has N inputs and M outputs, where N and M are positive integers. In operation, when an input point set 130 (denoted herein as x) is inputted to the trained neural network 120, the trained neural network 120 applies a network point function 122 to the input point set 130 to generate an output point set 140. As shown, the input point set 130 includes, without limitation, input points 132(1)-132(N), and the output point set 140 includes, without limitation, output points 142(1)-142(M). The inputs to the trained neural network 120 and the input points 132 are also commonly referred to as, respectively, "features" and "feature values."

Each of the input points 132 and each of the outputs points 142 is a value associated with any type of variable without any representation of an associated uncertainty. For instance, in some embodiments, the input point set 130 is an image, each of the input points 132 is an integer that specifies an intensity for a different pixel in the image, and each of the output points 142 is an estimated probability that the image is associated with a different class (e.g., dog, cat, person, etc.). In other embodiments, the input point set 130 is a multidimensional word vector, each of the input points 132 is a different component of the multidimensional word vector, and each of the output points 142 is a different predicted quantity associated with the word vector.

The trained neural network 120 includes, without limitation, any number of neurons that are arranged into a series of layers. The first layer of neurons is also referred to herein as the input layer, the last layer of neurons is also referred to herein as the output layer, and the remaining layers are also referred to herein as hidden layers. The input layer includes N neurons that each receives a different one of the input points 132 that is subsequently inputted into one or more of the neurons in the first hidden layer based on the connectivity of the trained neural network 120. Based on the "internal point(s)" received from the preceding layer, each neuron in a hidden layer computes new internal points and inputs the new internal points to one or more of the neurons in the subsequent layer. The output layer includes M neurons that generate output points 142 based on the internal point(s) received from the preceding layer.

In general, each of the neurons in a non-input layer of the trained neural network 120 combines the inputted internal points based on learned parameter values (i.e., weights and biases) to generate an internal point a. Each of the neurons in a hidden layer can be configured to output the internal point a to the next layer or apply a non-linear activation function to the internal point a to generate an internal point b and then output the internal point b to the next layer. Each of the neurons in the output layer can be configured to output the internal point a as the associated output point 142 or apply a non-linear activation function to the internal point a to generate an internal point b and then output the internal point b as the associated output point 142.

Each of the internal point combinations and each of the non-linear activation functions executed in the layers of the trained neural network 120 is referred to herein as a "point transformation," Accordingly, each non-input layer in the trained neural network 120 executes one or two point transformations. Further, the network point function 122 that describes how the trained neural network 120 generates the output points 142 based on the input points 132 may be expressed as the following equation (1):

$$f(x)=f^{(1)} \circ \ldots \circ f^{(L)})(x) \qquad (1)$$

In equation (1), f(x) is the network point function 122 implemented by the trained neural network 120, and the hollow circle denotes function composition. The sequence of three filled-in dots indicates that there are a total of L point transformations included in the trained neural network 120. For explanatory purposes only, a post-fixed, parenthetical superscript is used to identify the order in which the point transformation occurs within the trained neural network 120. Accordingly, $f^{(1)}$ denotes the first point transformation executed by the neurons in the first hidden layer, and $f^{(L)}$ denotes the last point transformation executed by the neurons in the output layer. In general, for each integer p from 1 to L, $f^{(p)}$ is the $p^{th}$ point transformation included in the trained neural network 120.

As discussed above, trained neural networks are usually implemented without understanding what the trained neural network actually learned during training. Implementing a trained neural network without properly understanding the trained neural network can reduce the reliability of the trained neural network, hinder efforts to improve the trained neural network, and reduce opportunities to re-purpose portions of the trained neural network to new or different problems.

Estimating Shapley Values for Trained Neural Networks

To address the above problems, the compute instance 110 implements a relevance application 140 that automatically estimates Shapley values for the trained neural network 120. The relevance application 140 resides in the memory 116 and executes on the processor 112. As shown, the relevance application 140 computes a Shapley value matrix 190 based on the trained neural network 120 and the input point set 130. The Shapley value matrix 190 includes, without limitation, Shapley value vectors 192(1) to 192(N), where the Shapley value vector 192(i) is associated with the input point 132(i) and is denoted herein as The Shapley value vector 192(i) includes, without limitation, M estimated Shapley values (not shown), where the estimated Shapley value (denoted herein as $r_{i,j}$) accurately quantifies a contribution of the input point 132(i) to the output point 142(j).

As persons skilled in the art will recognize, the Shapley value $r_{i,j}$ specifies the average marginal contribution of the input point 132(i) to the output point 142(j) across all possible coalitions of the (N−1) other input points 132 included in the input point set 130. Each coalition is a different subset of the other input points 132 included in the input point set 130 and is associated with a coalition size 156 of q (an integer between 0 and (N−1)) that specifies the total number of the input points 132 that are included in the coalition. Note that the input points 132 that are not included in the coalition are considered to be replaced with an associated baseline point (e.g., zero).

As persons skilled in the art will recognize, computing the Shapley value $r_{i,j}$ exactly requires $2^N$ unique network evaluations of the trained neural network 120. As referred to herein, a "network evaluation" of a neural network is the propagation of a set of value(s) for the input(s) of the neural network through the layers of the neural network to compute the value(s) of the output(s) of the neural network.

Instead of computing exact Shapley values, the relevance application 140 implements a probabilistic framework to compute estimated Shapley values. The relevance application 140 computes estimated Shapley values associated with the input point 132(i) based on expected marginal contributions of the input point 132(i) with respect to different distributions of subsets of the coalitions that have different coalition sizes 156. As shown, the relevance application 140 includes, without limitation, a neural network conversion engine 150, an input converter 152, a probabilistic neural network 160, a coalition size list 154, and N instances of a Shapley value engine 170. In alternate embodiments, the relevance application 140 may include any number of instances of the Shapley value engine 170.

The relevance application 140 initially operates in a framework generation mode and subsequently operates in an evaluation mode. In the framework generation mode, the neural network conversion engine 150 generates the input converter 152 and the probabilistic neural network 160 based on the trained neural network 120. To generate the input converter 152, the neural network conversion engine 150 generates a probabilistic version of the point transformation $f^{(1)}$. As described previously herein, $f_{(1)}$ denotes the first point transformation executed by the neurons in the first hidden layer included the trained neural network 120. In general, the probabilistic version of a point transformation $f^{(p)}$ is referred to herein as a distribution transformation and is denoted as $\hat{f}^{(p)}$. Further, the distribution transformation $\hat{f}^{(1)}$ corresponding to the point transformation $f^{(1)}$ is referred to herein as an "initial distribution transformation."

The initial distribution transformation converts the input point set 130 (denoted herein as x) to a partial input distribution set 182(i,q) based on the input point 132(i), and the coalition size 156(q). The partial input distribution set 182(i, q) is denoted as $(\mu_{i,q}, \sigma_{i,q}^2)$ and specifies a different distribution for each of the outputs of $f^{(1)}$, where each distribution is represented as a mean and variance of an isotropic Gaussian. A combination of a mean and a variance representing a distribution is also referred to herein as a "statistical set." The $j^{th}$ distribution ($\mu_{i,q,j}$, $\sigma_{i,q,j}^2$) specified in the partial input distribution set 182($i$, $q$) is an estimated distribution of the values of the $j^{th}$ internal point generated by $f^{(1)}$ over the subset of coalitions of the input point set 130 formed without the input point 132($i$) that have the coalition size 156($q$).

The neural network conversion engine 150 configures the input converter 152 to execute the initial distribution transformation to generate the partial input distribution set 182($i$, $q$) and then modify the partial input distribution set 182($i$, $q$) based on the target input point 132($i$) and $f^{(1)}$ to generate a full input distribution set 184($i$, $q$). The full input distribution set 184($i$, $q$) is denoted herein as ($\bar{\mu}_{i,q}$, $\bar{\sigma}_{i,q}^2$) and specifies a different distribution for each of the outputs of $f^{(1)}$, where each distribution is represented as a mean and variance of an isotropic Gaussian. The $j^{th}$ distribution ($\bar{\mu}_{i,q,j}$, $\bar{\sigma}_{i,q,j}^2$) specified in the full input distribution set 182($i$, $q$) is an estimated distribution of the values of the $j^{th}$ internal point generated by $f^{(1)}$ over the subset of coalitions of the input point set 130 formed without the input point 132($i$) that have the coalition size 156($q$) and are adjusted to specify the input point 132($i$). Note that in some embodiments, the $j^{th}$ variance included in the full input distribution set 184($i$, $q$) is equal to the $j^{th}$ variance included in the partial input distribution set 182($i$, $q$).

If the total number of point transformations (L) included in the trained neural network 120 is equal to 1, then the neural network conversion engine 150 sets the probabilistic neural network 160 equal to NULL. Otherwise, to generate the probabilistic neural network 160, the neural network conversion engine 150 generates a probabilistic version of each of the point transformations $f^{(2)}$-$f^{(L)}$. More precisely, for the point transformations $f^{(2)}$-$f^{(L)}$, the neural network conversion engine 150 generates, respectively, the distribution transformations $\hat{f}^{(2)}$-$\hat{f}^{(L)}$. The neural network conversion engine 150 then generates the probabilistic neural network 160 that propagates an input distribution set through the distribution transformations $\hat{f}^{(2)}$-$\hat{f}^{(L)}$ to generate an output distribution set. The input distribution set is either the full input distribution set 184 or the partial input distribution set 182. The probabilistic neural network 160 implements a network distribution function 162 that may be expressed as the following equation (2):

$$f(\mu, \sigma^2) = (\hat{f}^{(2)} \circ \ldots \circ \hat{f}^{(L)})(\mu, \sigma^2) \quad (2)$$

If the non-initial point transformation $f^{(p)}$ transforms a total of a points into a total of b points, then the corresponding non-initial distribution transformation $\hat{f}^{(p)}$ transforms a total of a distributions into a total of b distributions. If the input distribution set to the probabilistic neural network 160 is the partial input distribution set 182($i$, $q$), then the output distribution set is a partial output distribution set 186($i$, $q$) that is denoted herein as ($\mu_{i,q}^{(L)}$, $\sigma_{i,q}^{2(L)}$). If the input distribution set is the full input distribution set 184($i$, $q$), then the output distribution set is a full output distribution set 188($i$, $q$) that is denoted herein as ($\bar{\mu}_{i,q}^{(L)}$, $\bar{\sigma}_{i,q}^{2(L)}$). The $j^{th}$ distribution set included in the partial output distribution set 186($i$, $q$) and the $j^{th}$ distribution set included in the full output distribution sets 188($i$, $q$) correspond to the output point 142($j$).

The neural network conversion engine 150 may generate the input converter 152 and the probabilistic neural network 160 in any technically feasible fashion. An example of the neural network conversion engine 150 is described in greater detail in conjunction with FIG. 2. In alternate embodiments, the input converter 152 may generate input distributions that are represented in any technically feasible fashion and the probabilistic neural network 150 may propagate distributions that are represented in any technically feasible fashion. In the same or other alternate embodiments, instead of the internal converter 152 and the probabilistic neural network 160, the neural network conversion engine 150 may generate any type of probabilistic framework that is consistent with any type of trained neural network 120 in any technically feasible fashion.

In the evaluation mode, the relevance application 150 configures the Shapley value engine 170 to compute the Shapley value vectors 192 using the input converter 152 and the probabilistic neural network 160. First, the relevance application 160 generates the coalition size list 154 that specifies the coalition sizes 156 that the Shapley value engine 170 uses to compute the Shapley value vectors 192. The relevance application 140 may generate the coalition size list 154 in any technically feasible fashion.

For instance, in some embodiments, the relevance application 140 includes all of the N possible coalition sizes 156 in the coalition size list 154. Accordingly, the relevance application 140 sets K equal to N and the coalition sizes 156(1)-156(N) equal to, respectively 0-(N-1). Importantly, empirical results have shown that the accuracy of the Shapley value vectors 192 do not change significantly when selecting a relatively small value of K (e.g., 10) instead of N. To improve efficiency, in some embodiments, the relevance application 140 sets K equal to an integer less than N, the coalition size 156(1) equal to 0, the coalition size 156(K) equal to (N-1), and the coalitions sizes 156(2)-156(N-1) equal to roughly evenly-spaced integers between 0 and (N-1).

For each of the input points 132($i$) included in the input point set 130, the relevance application 140 configures the Shapley value engine 170($i$) to compute the Shapley value vector 192($i$) based on the input point set 130, the input point 132($i$), the coalition size list 154, the input converter 152, and the probabilistic neural network 160. As shown, the Shapley value engine 170($i$) includes, without limitation, neural network wrappers 180($i$,1)-180($i$, K) and the Shapley value vector 192($i$).

The neural network wrapper 180($i$,$q$) computes a marginal contribution vector 172($i$, $q$), denoted as $m_{i,q}$. The marginal contribution vector 172($i$, $q$) estimates the marginal contributions of the input point 132($i$) to each of the output points 142 over the subset of coalitions of the input point set 130 formed without the input point 132($i$) that have the coalition size 156($q$). In operation, the neural network wrapper 180($i$,$q$) inputs the trained neural network 120, the input point set 130 $x$, the input point 132($i$) and the target coalition size 156($q$) to the input converter 152. In response, the neural network wrapper 180($i$,$q$) receives the partial input distribution set 182($i$, $q$) and the full input distribution set 184($i$, $q$).

If the total number of point transformations (L) included in the trained neural network 120 is equal to 1, then the probabilistic neural network 160 is NULL, and the neural network wrapper 180($i$,$q$) sets the partial output distribution set 186($i$, $q$) equal to the partial input distribution set 182($i$, $q$). Similarly, the neural network wrapper 180($i$,$q$) sets the full output distribution set 188($i$, $q$) equal to the full input distribution set 184($i$, $q$).

Otherwise, the neural network wrapper 180($i$,$q$) inputs the partial input distribution set 182($i$, $q$) to the probabilistic neural network 160 and, in response, receives the partial output distribution set 186(*i, q*). The neural network wrapper 180(*i,q*) also inputs the full input distribution set 184(*i, q*) to the probabilistic neural network 160 and, in response, receives the full output distribution set 188(*i, q*).

Subsequently, the neural network wrapper 180(*i,q*) performs an element-wise subtraction between the "partial" means $\mu_{i,q}^{(L)}$ specified in the partial output distribution set 186(*i, q*) and the "full" means $\bar{\mu}_{i,q}^{(L)}$ specified in the full output distribution set 186(*i, q*) to generate a delta mean vector ($\bar{\mu}_{i,q}^{(L)} - \mu_{i,q}^{(L)}$). The neural network wrapper 180(*i,q*) sets the marginal contribution vector 172(*i, q*) equal to the delta mean vector divided by the size K of the coalition size list 156. The marginal contribution vector 172 may be denoted as $m_{i,q}$ and expressed as the following equation (3):

$$m_{i,q} = \frac{1}{K}(\bar{\mu}_{i,q}^{(L)} - \mu_{i,q}^{(L)}) \quad (3)$$

Importantly, the marginal contribution vector 172(*i, q*) estimates the marginal contributions of the input point 132(*i*) to the output points 142 across the subsets of the coalitions of the input point set 130 formed without the input point 132(*i*) that have the coalition size 156(*q*). The Shapley value engine 170(*i*) then sets the Shapley value vector 192(*i*) equal to the sum of the marginal contribution vectors 172(*i*,1)-172(*i*,K). In general, the Shapley value vector 192(*i*), denoted as $r_i$, may be expressed as the following equation (4):

$$r_i = \sum_{q=1}^{q=K} m_{i,q} \quad (4)$$

The relevance application 140 stores the N Shapley value vectors 192(1)-192(N) as the Shapley value matrix 190. The relevance application 140 then displays and/or transmits any portion of the Shapley value matrix 190 to any number of software applications in any technically feasible fashion to provide insight into what the trained neural network 120 has learned. In alternate embodiments, the relevance application 140 may execute the evaluation phase for any number of input value sets 130 sequentially, concurrently, or any combination thereof.

Advantageously, the number of network evaluations that the relevance application 140 performs to compute the (N×M) Shapley values included in the Shapley value matrix 190 is (2×N×K). Because the largest possible value for K is N, the number of network evaluations that the relevance application 140 performs to compute the Shapley value matrix 190 is no greater than 2×N². Consequently, unlike prior art approaches that compute exact Shapley values to quantify what trained neural networks have learned, the relevance application 140 can efficiently compute Shapley values for complex trained neural networks having any number of inputs.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. As a general matter, the techniques disclosed herein are applicable to computing any number of Shapley values associated with any portion of a trained neural network 120 based on generating and propagating distributions through a probabilistic version of a least a portion of the trained neural network 120.

For instance, in some embodiments, the relevance application 140 may be configured to compute Shapley values for any number of the internal points in the trained neural network 120 in any technically feasible fashion. For example, the relevance application 140 could configure the probabilistic neural network 160 to store and append internal distributions to the output distribution set. The neural network wrapper 170 could compute and append internal marginal contributions to the marginal contribution vector 172, and the Shapley value engine 170 could compute and append internal Shapley values to the Shapley value vector 192.

Advantageously, relative to the prior art, the estimated Shapley values included in the Shapley value matrix 190 can more efficiently and more reliable quantify the behavior of the trained neural network 120 across a wide range of architectures and input types Accordingly, the relevance application 140 can be used to increase confidence in the trained neural network 120, improve the accuracy of the trained neural network 120, implement portions of the trained neural network 120 to solve a new or different problem, prune neurons to increase the efficiency of the trained neural network 120, etc.

For example, to understand why the trained neural network 120 misclassified a particular image as female, a user could configure the relevance application 140 to compute the Shapley value matrix 190 for the input point set 130 representing the image. The relevance application 140 could then display the Shapley value vector 192 corresponding to the output point 142 specifying the probability of female as a "Shapley image." The relevance application 140 could set the color of each pixel in the Shapley image based on the Shapley value of the associated input point 132. Accordingly, the coloring of the Shapley image would visually illustrate the contribution of each of the inputs points 132 with respect to the misclassification. The user could subsequently enhance the training dataset based on the insights provided by the Shapley image and retrain the trained neural network 120 to improve the accuracy.

In another example, as part of an effort to generate a more efficient, smaller trained neural network 120, a user could configure the relevance application 140 to compute the Shapley value matrix 190 that included all the internal Shapley values for each of a wide variety of input point sets 130. Based on the Shapley value matrices, the user could determine which of the neurons are contributing least to the output value sets 140 and, therefore, would be good candidates for pruning.

As persons skilled in the art will recognize, in various embodiments, the probabilistic neural network 160 may be optimized to perform any number of network evaluations in parallel, Consequently, in various embodiments, any number of the (2×N×K) network evaluations initiated by the neural network wrappers 180 may occur sequentially, concurrently, or any combination thereof. In the same or other embodiments, the relevance application 140 may process any number of input value sets 130 concurrently and the number of network evaluations that occur concurrently may exceed (2×N×K).

It will be appreciated that the system shown herein is illustrative and that variations and modifications are possible. The connection topology, including the number, location, and arrangement of input point sets 130, trained neural networks 120, and compute instances 110 may be modified as desired. In certain embodiments, one or more components shown in FIG. 1 may not be present.

Note that the techniques described herein are illustrative rather than restrictive, and may be altered without departing from the broader spirit and scope of the embodiments. In particular, the relevance engine 140, the neural network conversion engine 150, the input converter 152, the probabilistic neural network 160, the Shapley value engine 170, the neural network wrapper 180 may be implemented across any number of software applications in any combination. Further, in various embodiments, any number of the techniques disclosed herein may be implemented while other techniques may be omitted in any technically feasible fashion.

For instance, in some alternate embodiments, the relevance engine 140 may be configured to compute Shapley values for a single target output of the trained neural network 120. In such embodiments, the neural network conversion engine 150 may generate the input converter 152 and the probabilistic neural network 160 based on a target output point function that is implemented in the trained neural network 120 instead of the network point function 122. The partial input distribution set 182 and the full input distribution set 184 may be modified accordingly. The partial output distribution set 186, the full output distribution set 188, the marginal contribution vector 172, and the Shapley value vector 192 may be replaced with, respectively, a partial output distribution, a full output distribution, a marginal contribution, and a Shapley value. Finally, the Shapley value matrix 190 may be replaced with a list of N Shapley values, where each Shapley value corresponds to a different input point 132 and is generated by a different Shapley value engine 170.

Modifying Trained Neural Networks to Propagate Distributions

Figure 2:
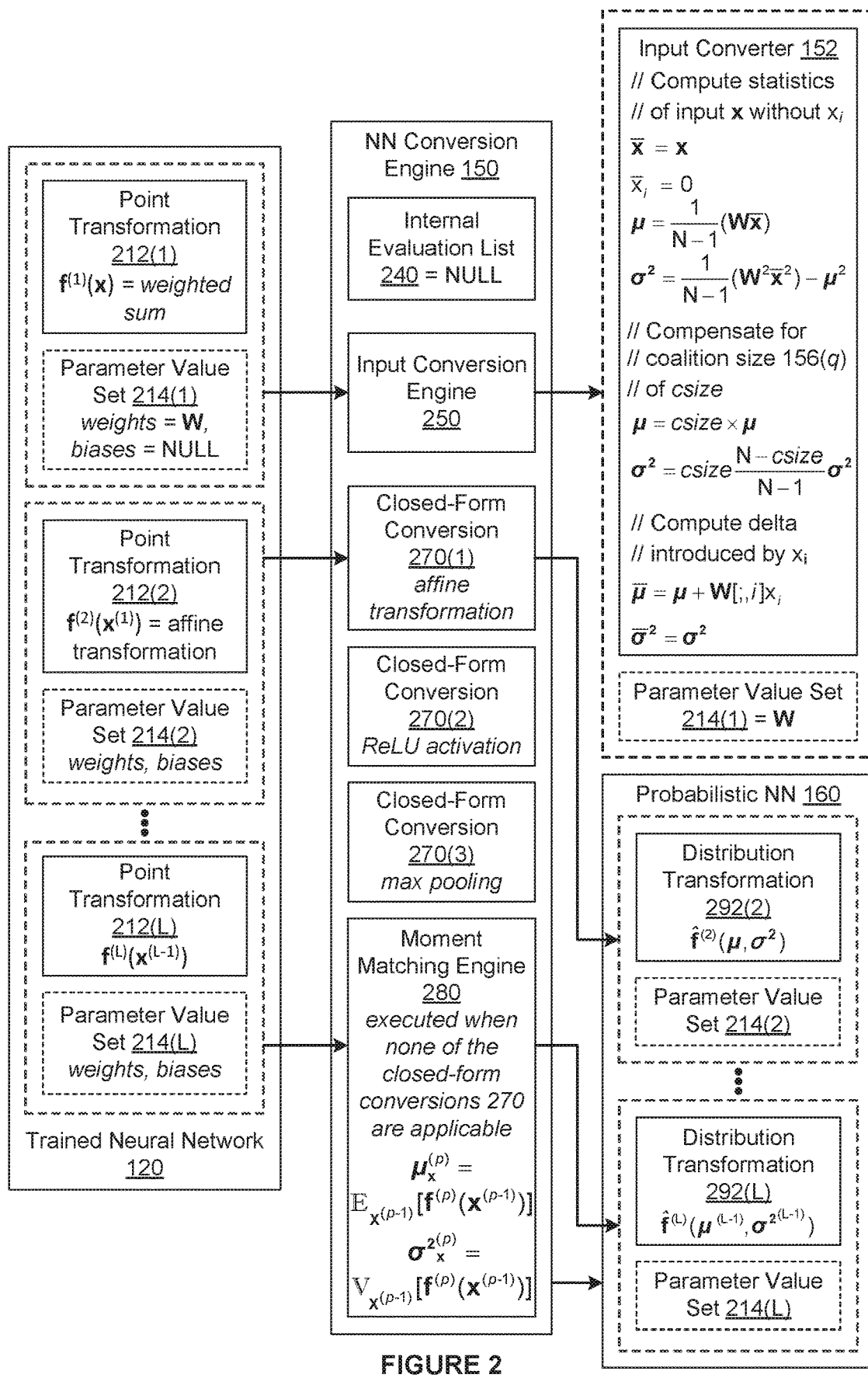
FIG. 2 is a more detailed illustration of the neural network conversion engine of FIG. 1, according to various embodiments.

FIG. 2 is a more detailed illustration of the neural network conversion engine 150 of FIG. 1, according to various embodiments. As shown, the neural network conversion engine 150 includes, without limitation, an input converter engine 250, any number of closed-form conversions 270, a moment mapping engine 280, and an internal evaluation list 240. For explanatory purposes only, FIG. 2 describes the operation of the neural network conversion engine 150 when generating the input converter 152 and the probabilistic neural network 160 corresponding to an exemplary trained neural network 120. In alternate embodiments, the operations performed by the neural network conversion engine 150 may vary based on the trained neural network 120.

As shown, the neural network conversion engine 150 generates the input converter 152 and the probabilistic neural network 160 based on the trained neural network 120. The trained neural network 120 includes, without limitation, point transformations 212(1)-212(L), where L is any positive integer. If the point transformation 212(p) is parameterizable, then the trained neural network also includes a parameter value set 214(p) that specifies the values of the associated learned parameters (e.g., weights and/or biases). As shown, the point transformation 212(p) is denoted as $f^{(p)}$ and generates the point set $x^{(p)}$ based on point set $x^{(p-1)}$.

As described previously herein, to generate the input converter 152, the neural network conversion engine 150 generates a distribution transformation 292(1), denoted as $\bar{f}^{(1)}$, that is a probabilistic version of the point transformation 212(1) $f^{(1)}$. While the point transformation 212(1) converts the input point set 130 $x$ to an internal point set, the distribution transformation 292(1) converts the input point set 130 $x$ to the partial input distribution set 182($i$, $q$) based on the input point 132($i$), and the coalition size 156($q$). For explanatory purposes only, the point transformation 212(1) is a weighted sum of the input value set 130 that can be expressed as the following equation (5):

$$f^{(1)}(x) = Wx \qquad (5)$$

In equation (5), W denotes a weight matrix specified in the parameter value set 214(1). The probabilistic version of equation (5) for the input point 132($i$) and csize equal to the coalition size 156($q$) can be expressed as the following equations (6a)-(6f):

$$\bar{x} = x \qquad (6a)$$

$$\bar{x}_i = 0 \qquad (6b)$$

$$\mu = \frac{1}{N-1}(W\bar{x}) \qquad (6c)$$

$$\sigma^2 = \frac{1}{N-1}(W^2\bar{x}^2) - \mu^2 \qquad (6d)$$

$$\mu = csize \times \mu \qquad (6e)$$

$$\sigma^2 = csize \frac{N - csize}{N-1} \sigma^2 \qquad (6f)$$

The equations 6(a)-6(d), compute input statistics for the input point set 130 excluding the input point 132($i$). The equations (6e)-(6f) modify the input statistics to correspond to a distribution of coalitions having the coalition size 156($q$) of csize and specify, respectively, the means and variances included in the partial input distribution set 182($i$, $q$). The partial input distribution set 182($i$, $q$) specifies the distributions of internal points generated by the point transformation 212(1) for coalitions of the coalition size 156 of q that are formed from the input point set 130 without the input point 132($i$).

The neural network conversion engine 150 also determines equations that express the full input distribution set 184($i$, $q$) based on the partial input distribution set 182($i$, $q$) and the point transformation 212(1). The full input distribution set 184($i$, $q$) specifies the distribution of internal points generated by the point transformation 212(1) for the subset of coalitions formed without the input point 132($i$) that have the coalition size 156($q$) and are adjusted to specify the input point 132($i$). Because the point transformation 212(1) is linear, the variances do not interact with the means and, consequently, the variances specified in the full input distribution set 184 are equal to the variances specified in the partial distribution set 182. The full input distribution set 184 can be expressed as the following equations (7a) and (7b):

$$\bar{\mu} = \mu + W[:,i]x_i \qquad (7a)$$

$$\bar{\sigma}^2 = \sigma^2 \qquad (7b)$$

In equation (7a), W is the weight matrix of size [J, N] specified in the parameter value set 214(1), which is left-multiplied by a vector of the input point 132($x$) having size [N, 1] to produce a vector of size [J, 1], J is the number of internal points generated by $f^{(1)}$ and, consequently, the number of input distributions included in each of the partial input distribution sets 182 and each of the full input distribution sets 184.

The neural network conversion engine 150 may generate the input converter 152 that implements the equations (6a)-(6f) and (7a)-(7b) in any technically feasible fashion. For instance, in some embodiments, the neural network conversion engine 150 generates the source code that, for explanatory purposes only, is depicted within the input converter 152. The neural network conversion engine 150 then configures a compiler (not shown) to generate the input converter 152 that is the executable version of the source code.

Subsequently, as shown, the neural network conversion engine 150 converts the point transformations 212(2)-212(L) included in the trained neural network 120 to the distribution transformations 292(2)-292(L) that are included in the probabilistic neural network 160. To convert the point transformation 292(p) to the distribution transformation 292(p), the neural network conversion engine 150 matches the first-order central moments (i.e., the means) and the second-order central moments (i.e., the variances). In general, matching the first-order central moments and the second-order central moments can be expressed as the following equations (8a) and (8b):

$$\mu_x^{(p)} = E_{X^{(p-1)}}[f^{(p)}(x^{(p-1)})] \tag{8a}$$

$$\sigma_x^{2(p)} = V_{X^{(p-1)}}[f^{(p)}(x^{(p-1)})] \tag{8b}$$

In equations (8a) and (8b), $\mathbb{E}[\cdot]$ denotes expectation and $V[\cdot]$ denotes variance. As persons skilled in the art will recognize, moment matching as per equations (8a) and (8b) can be derived in closed-form for some common point transformations 212. Accordingly, the neural network conversion engine 150 includes the three closed-form conversions 270(1)-270(3), where each closed-form conversion 270 is associated with a different type of common point transformation 212. In alternate embodiments, the neural network conversion engine 150 may include any number of closed-form conversions 270.

The closed-form conversion 270(1) is applicable to affine functions that are implemented by fully-connected layers. More precisely, the closed-form conversion 270(1) is applicable to any point transformation 212(p) that can be specified by the following equation (9):

$$f^{(p)}(z) = Wz + b \tag{9}$$

In equation (9), W and b denote, respectively, the weights and the biases specified in the parameter value set 214(p). The probabilistic version of equation (9) can be expressed based on the closed-form conversion 270(1) that includes the following equations (10a) and (10b):

$$\mu_{lin} = W\mu + b \tag{10a}$$

$$\sigma^2_{lin} = W^2 \sigma^2 \tag{10b}$$

In equations (10a) and (10b), W and b denote, respectively, the weights and the biases specified in the parameter value set 214(p), and $W^2$ denotes the element-wise square of W. For explanatory purposes only, the element-wise square of a matrix or a vector is denoted herein with a post-pended, non-parenthetical superscript of 2. Notably, as persons skilled in the art will recognize, equations (10a) and (10b) can be modified to apply to other linear functions, such as convolutions and mean pooling.

The closed-form conversion 270(2) is applicable to rectified linear unit ("ReLU") activations. A ReLU activation can be expressed as the following equation (11):

$$x_{relu} = \max(0, x) \tag{11}$$

The probabilistic version of a ReLU activation is a rectified Gaussian distribution with mean and variance that can be expressed based on the closed-form conversion 270(2) that includes the following equations (12a) and (12b):

$$\mu_{relu} = \mu \phi(\mu/\sqrt{\sigma^2}) + \sqrt{\sigma^2} \varphi(\mu/\sqrt{\sigma^2}) \tag{12a}$$

$$\sigma_{relu}^2 = (\mu^2 + \sigma^2)\phi(\mu/\sqrt{\sigma^2}) + \sqrt{\sigma^2}\varphi(\mu/\sqrt{\sigma^2}) - \mu_{relu}^2 \tag{12b}$$

The symbols $\phi$ and $\varphi$ denote, respectively, the cumulative distribution function and the probability density function of the standard normal distribution.

The closed-form conversion 270(3) is applicable to max pooling—in which the point transformation 212(i) returns the maximum response of g points. The probabilistic version of max pooling for two distributions ($\mu_A, \sigma^2_A$) and ($\mu_B, \sigma^2_B$) can be expressed based on the closed-form conversion 270(3) that includes the following equations (13a)-(13c):

$$\mu_{max} = \sqrt{\sigma_A^2 + \sigma_B^2} \cdot \varphi(\alpha) + (\mu_A - \mu_B) \cdot \phi(\alpha) + \mu_B \tag{13a}$$

$$\sigma_{max}^2 = (\mu_A + \mu_B)\sqrt{\sigma_A^2 + \sigma_B^2} \cdot \varphi(\alpha) + (\mu_A^2 + \sigma_A^2) \cdot \phi(\alpha) + (\mu_B^2 + \sigma_B^2) \cdot (1 - \phi(\alpha)) - \mu_{max}^2 \tag{13b}$$

$$\alpha = (\mu_A - \mu_B)/\sqrt{\sigma_A^2 + \sigma_A^2} \tag{13c}$$

In operation, the neural network conversion engine 150 applies the closed-form conversion 170(3) recursively to determine the probabilistic version of max pooling for more than two points.

To convert the point transformation 212(p) to the distribution transformation 292(p), the neural network engine 150 determines whether one of the closed-form conversions 270 is applicable to the point transformation 212(p). If the neural network conversion engine 150 determines that one of the closed-form conversions 270 is applicable to the point transformation 212(p), then the neural network conversion engine 150 generates the distribution transformation 292(p) based on the point transformation 212(p) and the applicable closed-form conversion 270.

If, however, the neural network conversion engine 150 determines that none of the closed-form conversions 270 are applicable to the point transformation 212(p), then the moment matching engine 280 applies equations (8a) and (8b) to the point transformation 212(p) to determine the distribution transformation 292(p). The moment matching engine 280 may apply the equations (8a) and (8b) in any technically feasible fashion.

If the point transformation 212(p) is associated with the parameter value set 214(p), then the distribution transformation 292(p) is also associated with the parameter value set 214(p) and the neural network conversion engine 150 adds the parameter value set 214(p) to the probabilistic neural network 160. Furthermore, the neural network conversion engine 150 replicates the architecture of the portion of the trained neural network 120 that implements the point transformations 212(2)-212(L) when generating the probabilistic neural network 160. More precisely, the neural network conversion engine 150 replicates the arrangement (e.g., layers) and interconnections of the neurons that execute the point transformations 212(2)-212(L) when generating and arranging the neurons that execute the distribution transformations 292(2)-292(L).

In various embodiments, the internal evaluation list 240 specifies one or more of the point transformations 212. For each of the point transformations 212 included in the internal evaluation list 240, the neural network conversion engine 150 configures the corresponding distribution function 292 to output the internal distributions. In a complementary fashion, the neural network wrapper 180, the Shapley value engine 170, and the relevance application 140 are configured to, respectively, compute the marginal contributions of the internal distributions, compute the Shapley values of the internal distributions based on the marginal contributions, and add the Shapley values associated with the internal distributions to the Shapley value matrix 190.

The neural network conversion engine 150 may acquire the internal evaluation list 240 in any technically feasible fashion. For instance, in some embodiments, the relevance engine 140 determines the internal evaluation list 240 based on user input received via a graphical user interface ("GUI") and then transmits the internal evaluation list 240 to the neural network conversion engine 150. In alternate embodiments, the relevance application 140, the neural network conversion engine 150, the Shapley value engine 170, and the neural network wrapper 180 may be configured to compute and store Shapley values for any number of internal points associated with the trained neural network in any technically feasible fashion.

Figure 3A:
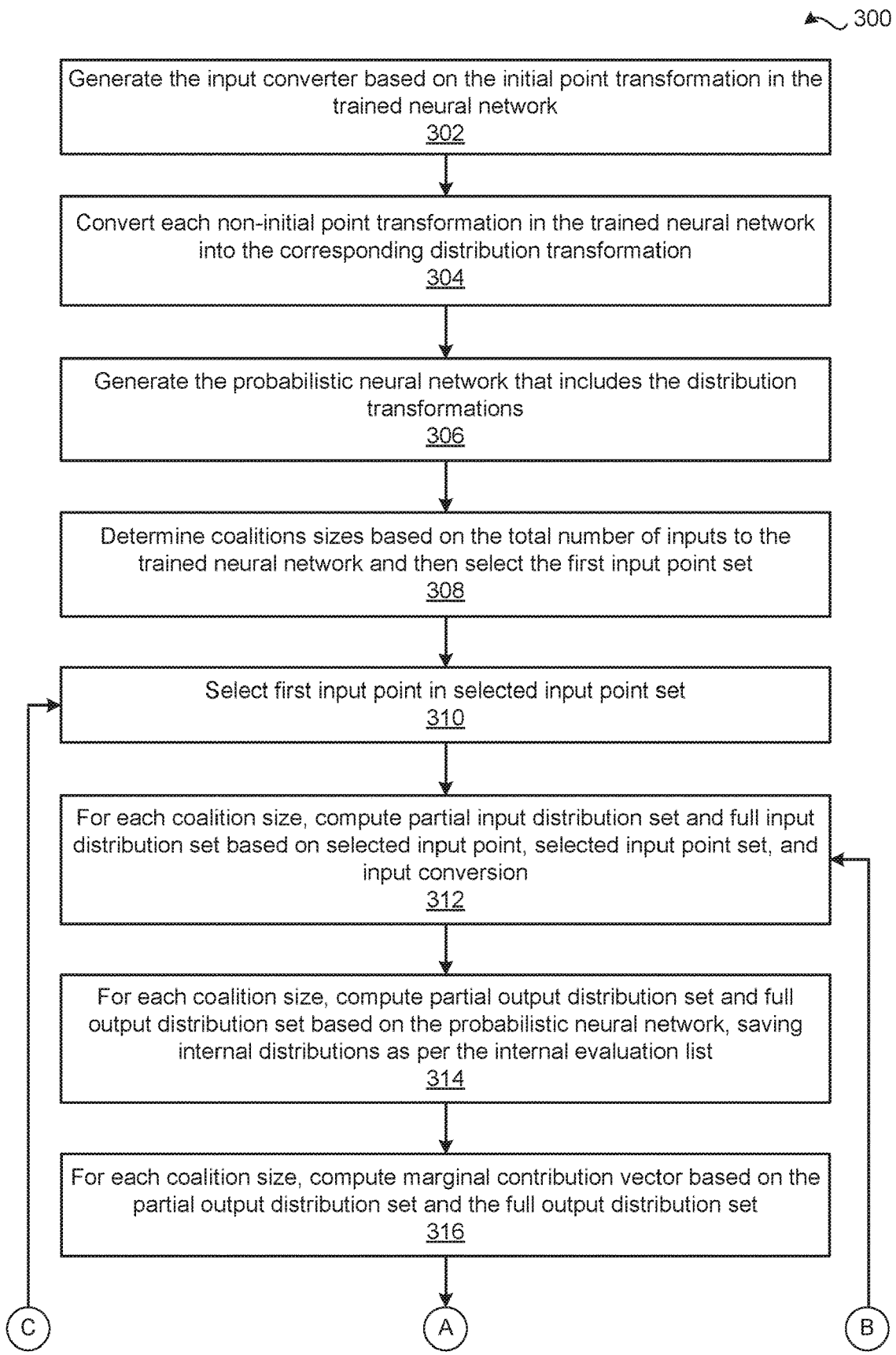
FIGS. 3A-3B set forth a flow diagram of method steps for quantifying what a neural network has learned during a training phase, according to various embodiments.
Figure 3B:
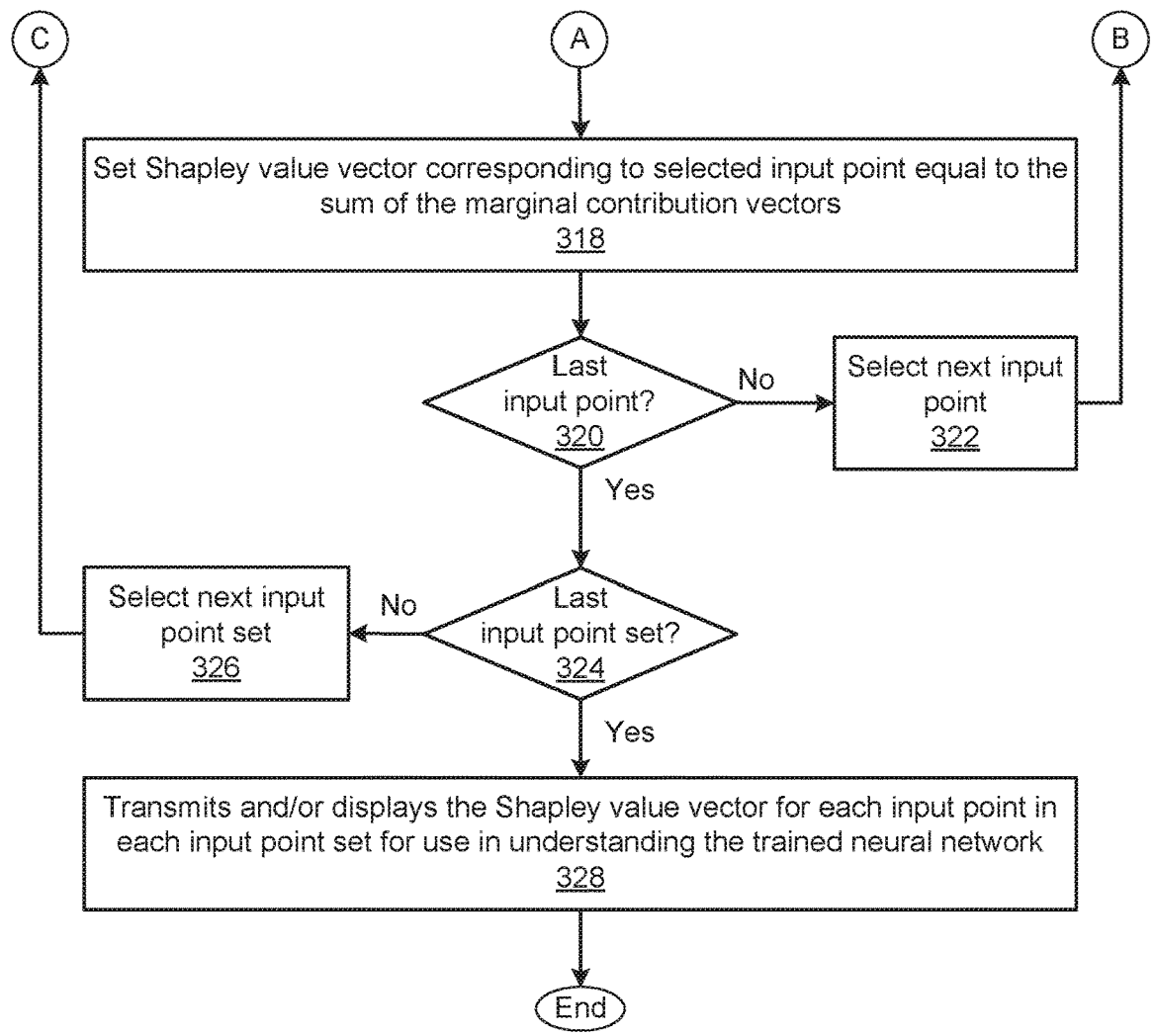

FIGS. 3A-3B set forth a flow diagram of method steps for quantifying what a neural network has learned during a training phase, according to various embodiments. Although the method steps are described with reference to the systems of FIGS. 1 and 2, persons skilled in the art will understand that any system configured to implement the method steps, in any order, falls within the scope of the embodiments.

As shown, a method 300 begins at step 302, where the neural network conversion engine 150 generates the input converter 152 based on the initial point transformation 212(1) included in the trained neural network 120. At step 304, the neural network conversion engine 150 converts each of the non-initial point transformations 212(2)-212(N) in the trained neural network 120 to the corresponding distribution transformation 292(2)-292(L). At step 306, the neural network conversion engine 150 generates the probabilistic neural network 160 that includes the distribution transformation 292(2)-292(L) and implements the network distribution function 162. At step 308, the relevance application 140 determines the coalition sizes 156 included in the coalition list 154 based on the total number of inputs to the trained neural network 120 and then selects the first input point set 130.

At step 310, the relevance application 140 selects the input point 132(1) included in the selected input point set 130. At step 312, for each of the coalition sizes 156($q$), the neural network wrapper 180 computes the associated partial input distribution set 182($i,q$) and the associated full input distribution set 184 based on the selected input point 132($i$), the selected input point set 130, and the input converter 152. At step 314, for each of the coalition sizes 156($q$), the neural network wrapper 180 computes the partial output distribution set 186($i,q$) and the full output distribution set 188($i,q$) based on the probabilistic neural network 160 and, respectively, the partial input distribution set 182($i,q$) and the full input distribution set 184($i,q$). In some embodiments, as part of step 314, the neural network wrapper 180 or the probabilistic neural network 160 may store internal distributions as per the internal evaluation list 240.

At step 316, for each of the coalition sizes 156($q$), the neural network wrapper 180 computes the associated marginal contribution vector 172($i,q$) based on the partial output distribution set 186($i,q$) and the full output distribution set 188($i,q$). At step 318 (following path A in FIGS. 3A-3B), the Shapley value engine 170 sets the Shapley value vector 192($i$) associated with the selected input point set 130($i$) equal to the sum of the marginal contribution vectors 172($i,1$))-172($i,$K).

At step 320, the relevance application 140 determines whether the selected input point 132 is the last input point 132(N) included in the selected input point set 130. If, at step 320, the relevance application 140 determines that the selected input point 132 is not the last input point 132(N) included in the selected input point set 130, then the method 300 proceeds to step 322. At step 322, the relevance application 140 selects the next input point 132 included in the selected input point set 130. The method 300 then returns to step 312 (path B in FIGS. 3A-3B), where the relevance application 140 computes new partial input distribution sets 182 and new full input distribution sets 184 for the newly selected input point 132($i$).

If, however, at step 320, the relevance application 140 determines that the selected input point 132 is the last input point 132(N) included in the selected input point set 130, then the method 300 proceeds directly to step 324. At step 324, the relevance application 140 determines whether the selected input point set 130 is the last input point set 130. If, at step 324, the relevance application 140 determines that the selected input point set 130 is not the last input point set 130, then the method 300 proceeds to step 326. At step 326, the relevance application 140 selects the next input point set 130. The method 300 then returns to step 310 (path C in FIGS. 3A-3B), where the relevance application 140 selects the first input point 132(1) included in the newly selected input point set 130.

If, however, at step 324, the relevance application 140 determines that the selected input point set 130 is the last input point set 130, then the method 300 proceeds directly to step 328. At step 328, the relevance application 140 transmits and/or displays the Shapley value vector 130 for each input value 132 of each input value set 132 for use in understanding the trained neural network 120. The method 300 then terminates.

For explanatory purposes only, the steps 310-318 in method 300 are described as occurring sequentially for each input point 132 of each input point set 130. However, in various embodiments, any number of the steps 310-318 may occur concurrently, sequentially, or any combination thereof for any number of the input points 132 and any number of the input point sets 130. Similarly, the steps 312-316 are described as occurring sequentially for the coalition sizes 156 included in the coalition size list 154. However, in various embodiments, any number of the steps 312-316 may occur concurrently, sequentially, or any combination thereof for any number of the coalition sizes 156.

In sum, the disclosed techniques may be used to efficiently quantify what trained neural networks have learned. In one embodiment, a relevance application includes, without limitation, a neural network conversion engine and a Shapley value engine. The neural network conversion engine generates a probabilistic representation of a trained neural network. First, the neural network conversion engine converts the initial point transformation of the trained neural network to an input converter. The initial point transformation maps N input points included in an input point set to M internal points. By contrast, the input converter maps the input point set, a specified input point included in the input point set, and a specified coalition size to a partial input distribution set and a full input distribution set. The partial input distribution set specifies expected distributions for the M internal points over the subset of coalitions of the input point set formed without the specified input point that have the specified coalition size. The full input distribution set is the partial input distribution set adjusted to reflect the contribution of the selected input point to each of the M internal points. For each subsequent point transformation that propagates points within the trained neural network, the neural network conversion engine generates a corresponding distribution transformation that propagates distributions within the probabilistic neural network.

Subsequently, the relevance application generates a coalition size list having K approximately equally spaced coalition sizes spanning from 1 to (N−1). For each of the (N×K) combinations of the N input points and the K coalition sizes, the relevance application generates a partial input distribution set and a full input distribution set using the input converter. Subsequently, for each of the (N×K) partial input distribution sets, the relevance application generates a corresponding partial output distribution set using the probabilistic neural network. In addition, for each of the (N×K) full input distribution sets, the relevance application generates a corresponding full output distribution set using the probabilistic neural network. To determine the Shapley value representing the contribution of the $i^{th}$ input point to the $j^{th}$ output point, the relevance application computes the average difference between the K associated "full" means and the K associated "partial" means. For the $i^{th}$ input point and the $j^{th}$ output point, the associated full/partial means are the $j^{th}$ means in each of the full/partial output distribution sets associated with the $i^{th}$ input point.

At least one technical advantage of the disclosed techniques relative to the prior art is that the relevance application can more efficiently and more reliably quantify how a trained neural network operates across a wide range of architectures and input types. In particular, contrary to prior art approaches that use unreliable and/or non-robust heuristics, the relevance application uses statistical approximation to compute estimated Shapley values that more accurately quantify the contributions of input points to output points and, optionally, internal points. Further, estimating Shapley values using the disclosed techniques is computationally more efficient than computing exact Shapley values, as is done in prior art approaches. In that regard, the number of network evaluations required to compute exact Shapley values for a set of N input points to a trained neural network is $\mathcal{O}(2^N)$, while the number of network evaluations required to estimate Shapley values for the set of input points using the relevance application is $\mathcal{O}(2 \times K \times N)$. Accordingly, the relevance application consumes less time and computational resources than prior art approaches that compute exact Shapley values and can be used to more accurately and effectively evaluate and understand how a trained neural network operates relative to prior art approaches. As described previously herein, insights into a trained neural network provided by the estimated Shapley values can be used to efficiently re-train the trained neural network to increase accuracy and reliability. These technical advantages provide one or more technological advancements over the prior art.

1. In some embodiments, a computer-implemented method for quantifying how a trained neural network operates comprises generating a plurality of input distributions based on a first plurality of input points associated with the trained neural network, wherein each input distribution is characterized by a mean and a variance associated with a different neuron included in the trained neural network; propagating the plurality of input distributions through a probabilistic neural network that is derived from at least a portion of the trained neural network to generate one or more output distributions; and based on a first output distribution included in the one or more output distributions, computing a contribution of a first input point included in the first plurality of input points to a difference between a first output point associated with a first output of the trained neural network and an estimated mean prediction associated with the first output.

2. The computer-implemented method of clause 1, wherein the contribution comprises an estimated Shapley value.

3. The computer-implemented method of clauses 1 or 2; wherein the trained neural network comprises at least one of a trained convolutional neural network and a trained multilayer perceptron.

4. The computer-implemented method of any of clauses 1-3, wherein generating the plurality of input distributions comprises replacing the first input point included in the first plurality of input points with a baseline value to generate a second plurality of input points; and for each neuron included in a hidden layer of the trained neural network, estimating a distribution of internal points that the neuron would compute across one or more coalitions of the second plurality of input points having a first coalition size.

5. The computer-implemented method of any of clauses 1-4, wherein propagating the plurality of input distributions comprises inputting a plurality of input statistical sets representing the plurality of input distributions to a composite function that is formed from a plurality of distribution transformations associated with the probabilistic neural network.

6. The computer-implemented method of any of clauses 1-5, wherein each distribution transformation included in the plurality of distribution transformations comprises a probabilistic version of a different point transformation associated with the at least a portion of the trained neural network.

7. The computer-implemented method of any of clauses 1-6, wherein the first output distribution is associated with both a baseline value for a first input of the trained neural network and a first coalition size that is related to the first plurality of input points, and computing the contribution comprises performing a subtraction operation between a first mean of the first output distribution and a second mean of a second output distribution to compute a first marginal distribution; wherein the second output distribution is associated with both the first input value for the first input and the first coalition size; and aggregating the first marginal contribution with at least a second marginal contribution associated with a second coalition size to compute the contribution, wherein the second coalition size is related to the first plurality of input points.

8. The computer-implemented method of any of clauses 1-7, wherein computing the contribution comprises computing a first marginal contribution based on the first output distribution; and aggregating a plurality of marginal contributions that includes the first marginal contribution to compute the contribution, wherein each marginal contribution is associated with a different coalition size included in a plurality of coalitions sizes that is related to the first plurality of input points.

9. The computer-implemented method of any of clauses 1-8, further comprising computing the plurality of coalition sizes based on the total number of inputs of the trained neural network.

10. The computer-implemented method of any of clauses 1-9, further comprising, based on a second output distribution included in the one or more output distributions, computing a contribution of the first input point to a difference between a second output point associated with a second output of the trained neural network and an estimated mean prediction associated with the second output.

11. In some embodiments, one or more non-transitory computer readable media include instructions that, when executed by one or more processors, cause the one or more processors to quantify how a trained neural network operates by performing the steps of generating a plurality of input statistical sets based on a first plurality of input points associated with the trained neural network, wherein each input statistical set characterizes a distribution associated with a different neuron included in the trained neural network; propagating the plurality of input statistical sets through a probabilistic neural network that is derived from at least a portion of the trained neural network to generate one or more output statistical sets; and based on a first output statistical set included in the one or more output statistical sets, computing a contribution of a first input point included in the first plurality of input points to a difference between a first output point associated with a first output of the trained neural network and an estimated mean prediction associated with the first output.

12, The one or more non-transitory computer readable media of clause 11, wherein the contribution comprises an estimated Shapley value.

13. The one or more non-transitory computer readable media of clauses 11 or 12, wherein the trained neural network comprises at least one of a trained convolutional neural network and a trained multilayer perceptron.

14. The one or more non-transitory computer readable media of any of clauses 11-13, wherein each input statistical set included in the plurality of input statistical sets includes a different mean and a different variance, and each output statistical set included in the one or more output statistical sets characterizes a distribution associated with a different output of the trained neural network.

15. The one or more non-transitory computer readable media of any of clauses 11-14, wherein a plurality of parameter values is associated with both the probabilistic neural network and the at least a portion of the trained neural network.

16. The one or more non-transitory computer readable media of any of clauses 11-15, wherein generating the plurality of input statistical sets comprises replacing the first input point included in the first plurality of input points with a baseline value to generate a second plurality of input points; and for each neuron included in a hidden layer of the trained neural network, determining an input statistical set that characterizes an estimated distribution of internal points that the neuron would compute across one or more coalitions of the second plurality of input points having a first coalition size.

17. The one or more non-transitory computer readable media of any of clauses 11-16, wherein the first output statistical set is associated with both a baseline value for a first input of the trained neural network and a first coalition size that is related to the first plurality of input points, and computing the contribution comprises performing a subtraction operation between a first mean included the first output statistical set and a second mean included a second output statistical set to compute a first marginal contribution, wherein the second statistical set is associated with both the first input value for the first input and the first coalition size; and aggregating the first marginal contribution with at least a second marginal contribution associated with a second coalition size to compute the contribution, wherein the second coalition size is related to the first plurality of input points.

18. The one or more non-transitory computer readable media of any of clauses 11-17, wherein computing the contribution comprises computing a first marginal contribution based on the first output statistical set; and aggregating a plurality of marginal contributions that includes the first marginal contribution to compute the contribution, wherein each marginal contribution is associated with a different coalition size included in a plurality of coalitions sizes that is related to the first plurality of input points.

19. The one or more non-transitory computer readable media of any of clauses 11-18, further comprising generating a probabilistic version of each point transformation included in a plurality of point transformations representing the at least a portion of the trained neural network to generate the probabilistic neural network.

20. In some embodiments, a system for quantifying how a trained neural network operate comprises one or more memories storing instructions; and one or more processors that are coupled to the one or more memories and, when executing the instructions, are configured to generate a plurality of input distributions based on a first plurality of input points associated with the trained neural network, wherein each input distribution is characterized by a mean and a variance associated with a different neuron included in the trained neural network; propagate the plurality of input distributions through a probabilistic neural network that is derived from at least a portion of the trained neural network to generate one or more output distributions; and compute an estimated Shapley value based on a first output distribution included in the one or more output distributions, wherein the estimated Shapley value quantifies a contribution of a first input point included in the first plurality of input points to a difference between a first output point associated with a first output of the trained neural network and an estimated mean prediction associated with the first output.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for quantifying how a trained neural network operates, the method comprising:
    generating a plurality of input distributions based on a first plurality of input points associated with the trained neural network, wherein each input distribution is represented as a mean and a variance associated with a different neuron included in the trained neural network;
    propagating the plurality of input distributions through a probabilistic neural network that is derived from at least a portion of the trained neural network to generate one or more output distributions; and
    based on a first output distribution included in the one or more output distributions, computing a contribution of a first input point included in the first plurality of input points to a difference between a first output point associated with a first output of the trained neural network and an estimated mean prediction associated with the first output.

2. The computer-implemented method of claim 1, wherein the contribution comprises an estimated Shapley value.

3. computer-implemented method of claim 1, wherein the trained neural network comprises at least one of a trained convolutional neural network and a trained multilayer perceptron.

4. The computer-implemented method of claim 1, wherein generating the plurality of input distributions comprises:
    replacing the first input point included in the first plurality of input points with a baseline value to generate a second plurality of input points; and
    for each neuron included in a hidden layer of the trained neural network, estimating a distribution of internal points that the neuron would compute across one or more coalitions of the second plurality of input points having a first coalition size.

5. The computer-implemented method of claim 1, wherein propagating the plurality of input distributions comprises inputting a plurality of input statistical sets representing the plurality of input distributions to a composite function that is formed from a plurality of distribution transformations associated with the probabilistic neural network.

6. The computer-implemented method of claim 5, wherein each distribution transformation included in the plurality of distribution transformations comprises a probabilistic version of a different point transformation associated with the at least a portion of the trained neural network.

7. The computer-implemented method of claim 1, wherein the first output distribution is associated with both a baseline value for a first input of the trained neural network and a first coalition size that is related to the first plurality of input points, and computing the contribution comprises:
    performing a subtraction operation between a first mean of the first output distribution and a second mean of a second output distribution to compute a first marginal distribution, wherein the second output distribution is associated with both the first input value for the first input and the first coalition size; and
    aggregating the first marginal contribution with at least a second marginal contribution associated with a second coalition size to compute the contribution, wherein the second coalition size is related to the first plurality of input points.

8. The computer-implemented method of claim 1, wherein computing the contribution comprises:
    computing a first marginal contribution based on the first output distribution; and
    aggregating a plurality of marginal contributions that includes the first marginal contribution to compute the contribution, wherein each marginal contribution is associated with a different coalition size included in a plurality of coalitions sizes that is related to the first plurality of input points.

9. The computer-implemented method of claim 8, further comprising computing the plurality of coalition sizes based on the total number of inputs of the trained neural network.

10. The computer-implemented method of claim 1, further comprising, based on a second output distribution included in the one or more output distributions, computing a contribution of the first input point to a difference between a second output point associated with a second output of the trained neural network and an estimated mean prediction associated with the second output.

11. One or more non-transitory computer readable media including instructions that, when executed by one or more processors, cause the one or more processors to quantify how a trained neural network operates by performing the steps of:
  generating a plurality of input statistical sets based on a first plurality of input points associated with the trained neural network, wherein each input statistical set represents a distribution associated with a different neuron included in the trained neural network;
  propagating the plurality of input statistical sets through a probabilistic neural network that is derived from at least a portion of the trained neural network to generate one or more output statistical sets; and
  based on a first output statistical set included in the one or more output statistical sets, computing a contribution of a first input point included in the first plurality of input points to a difference between a first output point associated with a first output of the trained neural network and an estimated mean prediction associated with the first output.

12. The one or more non-transitory computer readable media of claim 11, wherein the contribution comprises an estimated Shapley value.

13. The one or more non-transitory computer readable media of claim 11, wherein the trained neural network comprises at least one of a trained convolutional neural network and a trained multilayer perceptron.

14. The one or more non-transitory computer readable media of claim 11, wherein each input statistical set included in the plurality of input statistical sets includes a different mean and a different variance, and each output statistical set included in the one or more output statistical sets represents a distribution associated with a different output of the trained neural network.

15. The one or more non-transitory computer readable media of claim 11, wherein a plurality of parameter values is associated with both the probabilistic neural network and the at least a portion of the trained neural network.

16. The one or more non-transitory computer readable media of claim 11, wherein generating the plurality of input statistical sets comprises:
  replacing the first input point included in the first plurality of input points with a baseline value to generate a second plurality of input points; and
  for each neuron included in a hidden layer of the trained neural network, determining an input statistical set that represents an estimated distribution of internal points that the neuron would compute across one or more coalitions of the second plurality of input points having a first coalition size.

17. The one or more non-transitory computer readable media of claim 11, wherein the first output statistical set is associated with both a baseline value for a first input of the trained neural network and a first coalition size that is related to the first plurality of input points, and computing the contribution comprises:
  performing a subtraction operation between a first mean included the first output statistical set and a second mean included a second output statistical set to compute a first marginal contribution, wherein the second statistical set is associated with both the first input value for the first input and the first coalition size; and
  aggregating the first marginal contribution with at least a second marginal contribution associated with a second coalition size to compute the contribution, wherein the second coalition size is related to the first plurality of input points.

18. The one or more non-transitory computer readable media of claim 11, wherein computing the contribution comprises:
  computing a first marginal contribution based on the first output statistical set; and
  aggregating a plurality of marginal contributions that includes the first marginal contribution to compute the contribution, wherein each marginal contribution is associated with a different coalition size included in a plurality of coalitions sizes that is related to the first plurality of input points.

19. The one or more non-transitory computer readable media of claim 11, further comprising generating a probabilistic version of each point transformation included in a plurality of point transformations representing the at least a portion of the trained neural network to generate the probabilistic neural network.

20. A system for quantifying how a trained neural network operates, the system comprising:
  one or more memories storing instructions; and
  one or more processors that are coupled to the one or more memories and, when executing the instructions, are configured to:
    generate a plurality of input distributions based on a first plurality of input points associated with the trained neural network, wherein each input distribution is represented as a mean and a variance associated with a different neuron included in the trained neural network;
    propagate the plurality of input distributions through a probabilistic neural network that is derived from at least a portion of the trained neural network to generate one or more output distributions; and
    compute an estimated Shapley value based on a first output distribution included in the one or more output distributions, wherein the estimated Shapley value quantifies a contribution of a first input point included in the first plurality of input points to a difference between a first output point associated with a first output of the trained neural network and an estimated mean prediction associated with the first output.

* * * * *